United States Patent
Wu et al.

(10) Patent No.: US 10,408,963 B2
(45) Date of Patent: Sep. 10, 2019

(54) MEASUREMENT CALIBRATION APPARATUS, METHODS, AND SYSTEMS

(75) Inventors: Hsu-Hsiang Wu, Sugar Land, TX (US); Luis Emilio San Martin, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 1126 days.

(21) Appl. No.: 14/401,044

(22) PCT Filed: Jun. 28, 2012

(86) PCT No.: PCT/US2012/044624
§ 371 (c)(1),
(2), (4) Date: Nov. 13, 2014

(87) PCT Pub. No.: WO2014/003757
PCT Pub. Date: Jan. 3, 2014

(65) Prior Publication Data
US 2015/0106016 A1    Apr. 16, 2015

(51) Int. Cl.
*G01V 3/30* (2006.01)
*G01V 3/38* (2006.01)
*E21B 47/026* (2006.01)

(52) U.S. Cl.
CPC .............. *G01V 3/30* (2013.01); *G01V 3/38* (2013.01); *E21B 47/026* (2013.01)

(58) Field of Classification Search
CPC ......... G01V 3/28; G01V 3/38; G01V 2200/12
USPC ........................................................ 324/343
See application file for complete search history.

(56) References Cited

U.S. PATENT DOCUMENTS

| | | |
|---|---|---|
| 4,054,881 A | 10/1977 | Raab |
| 5,585,790 A | 12/1996 | Luling et al. |
| 5,955,884 A * | 9/1999 | Payton ............... G01V 3/26 324/339 |
| 6,636,045 B2 | 10/2003 | Tabarovsky et al. |
| 2003/0024305 A1 | 2/2003 | Ireland et al. |

(Continued)

FOREIGN PATENT DOCUMENTS

| | | |
|---|---|---|
| WO | WO-2011/043851 A1 | 4/2011 |
| WO | WO-2014003757 A2 | 1/2014 |
| WO | WO-2014003757 A3 | 1/2014 |

OTHER PUBLICATIONS

Pelcovits et al., Barron's AP Physics C: Advanced Placement Examination, Barron's Educational Series, 2008, pp. 243-245.*

(Continued)

*Primary Examiner* — Michael J Dalbo
(74) *Attorney, Agent, or Firm* — Gilliam IP PLLC (57) ABSTRACT

In some embodiments, an apparatus and a system, as well as a method and an article, may operate to determine spatial orientations of one or more transmitters attached to a first downhole component, relative to one or more receivers attached to a second downhole component, at common points in time during rotation of the first and the second downhole components. The first downhole component may be variably, rotationally coupled to the second downhole component. Further activity may include transforming raw measurements of transmitter signals provided by the receiver(s) into calibrated measurements based on the spatial orientations at the common points in time. Additional apparatus, systems, and methods are described.

20 Claims, 7 Drawing Sheets

(56) References Cited

U.S. PATENT DOCUMENTS

| | | |
|---|---|---|
| 2003/0076107 A1 | 4/2003 | Fanini et al. |
| 2004/0073371 A1 | 4/2004 | Haugland |
| 2006/0043973 A1* | 3/2006 | Chen ............... G01V 3/30 324/339 |
| 2008/0136419 A1* | 6/2008 | Seydoux ............ G01V 3/28 324/333 |
| 2008/0137474 A1 | 6/2008 | Dashevskiy et al. |
| 2009/0015261 A1 | 1/2009 | Yang et al. |
| 2009/0179647 A1* | 7/2009 | Wang ............... G01V 3/28 324/339 |
| 2009/0230968 A1* | 9/2009 | Bittar ............... E21B 47/024 324/338 |
| 2009/0309600 A1 | 12/2009 | Seydoux et al. |
| 2010/0001633 A1* | 1/2010 | Lee ............... H01L 27/3253 313/504 |
| 2011/0309948 A1* | 12/2011 | Montgomery ......... G01V 13/00 340/853.1 |

OTHER PUBLICATIONS

"International Application Serial No. PCT/US2012/044624, International Preliminary Report on Patentability dated Jan. 8, 2015", 7 pgs.

"European Application Serial No. 12880106.5, Office Action dated Jan. 29, 2015", 3 pgs.

"European Application Serial No. 12880106.5, Extended European Search Report dated Jan. 18, 2016", 7 pgs.

"European Application Serial No. 12880106.5, Reply filed May 29, 2015 to Office Action dated Jan. 29, 2015", 8 pgs.

"International Application Serial No. PCT/US2012/044624, Search Report dated Sep. 17, 2012", 2 pgs.

"International Application Serial No. PCT/US2012/044624, Written Opinion dated Sep. 17, 2012", 5 pgs.

\* cited by examiner

MEASUREMENT CALIBRATION APPARATUS, METHODS, AND SYSTEMS

PRIORITY APPLICATION

This application is a U.S. National Stage Filing under 35 U.S.C. § 371 of International Application PCT/US2012/044624, filed on 28 Jun. 2012, and published as WO 2014/003757 A3, which application and publication are hereby incorporated by reference herein in their entirety.

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, a variety of sensors and mounting configurations are used.

For example, Logging While Drilling/Measurement While Drilling (LWD/MWD) electromagnetic (EM) logging tools can be used as a mounting platform for down hole sensors, including transmitters and receivers (e.g., transmitting and receiving antennas, respectively). During drilling operations, when the transmitters and receivers are separately installed in different bottom hole assembly (BHA) sections (e.g., a mandrel, a drill bit section, etc.), sometimes the rotational speeds of different sections differ from each other, due to the effects of various coupling mechanisms. When this occurs, the signals between transmitters and receivers may become unsynchronized, resulting in reduced measurement accuracy.

DETAILED DESCRIPTION

To address some of the challenges described above, as well as others, apparatus, systems, and methods are described herein that may operate to increase the accuracy of variably, rotationally coupled sensors when they are used in down hole applications. For the purposes of this document, the phrase "variably, rotationally coupled" means that when two referenced components are coupled together in this manner, and one of the components is rotating, the other component may also rotate, but at a different speed, with the possibility of the speed difference between the two components changing over time. Under these circumstances, various embodiments of the invention can be used to calibrate received sensor data by effectively synchronizing signals between sets of transmitting and receiving sensors that are rotating at different relative speeds.

For example, in one embodiment, a method for synchronizing three transmitters and three receivers that are mounted on separate rotating parts (e.g., two different mandrels that are variably, rotationally coupled) of a LWD/MWD instrument is presented. Coupling measurements (received as "raw measurements") arising from three orthogonal transmission directions and three orthogonal reception directions, producing a total of nine coupling components, are used to synchronize rotating speeds between the LWD/MWD instrument parts, to calibrate the received signals. This is accomplished by obtaining information about the orientation of the transmitters and receivers in space. Formation tensor components are then extracted from the raw measurements of non-aligned transmitters and receivers to transform the raw measurements into calibrated measurements. Various example embodiments that can provide some or all of these advantages will now be described in detail.

Figure 1:
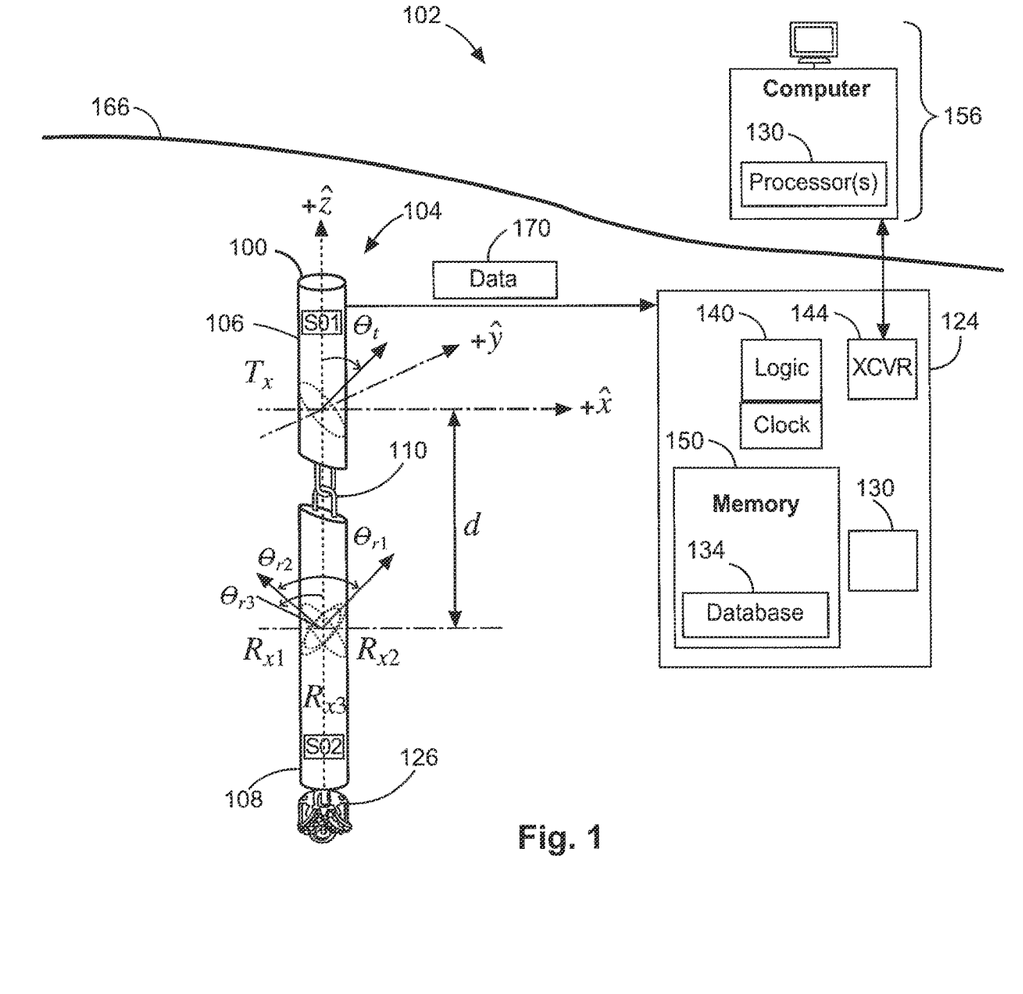
FIG. 1 is a block diagram of apparatus and systems according to various embodiments of the invention.

FIG. 1 is a block diagram of apparatus 100 and systems 102 according to various embodiments of the invention, in some embodiments, the system 102 comprises one or more of the apparatus 100, which may include a housing 104. The housing 104 might take the form of a wireline tool body, or a down hole tool, among others. Processor(s) 130 may be located at the Earth's surface 166, as part of a surface logging facility 156, and/or in a data acquisition system 124 above or below the surface 166, to be packaged with the apparatus 100, including the housing 104.

In many embodiments, the housing 104 comprises multiple components (e.g., mandrels, a drill bit, etc.) that are variably, rotationally coupled using a coupling mechanism 110. In FIG. 1, the housing 104 comprises a first component 106, housing a tilted transmitter $T_x$, and a second component 108, housing three tilted receivers $R_{x1}$, $R_{x2}$, $R_{x3}$.

Many other transmitter and receiver combinations and physical orientation configurations may be realized. For example, more transmitters $T_x$ may be used, more or less receivers may be used, and multiple ones of the transmitters and/or receivers may be mounted in a tilted orientation, or a non-tilted orientation (i.e., an orientation where the plane of the antenna is substantially orthogonal to the $\hat{Z}$ axis).

The housing 104 may include one or more spatial orientation packages SO1, SO2. A clock CLOCK may be used to synchronize the signal transmission and reception activity of the transmitter $T_x$ and receivers $R_x$, respectively.

The apparatus 100 may comprise a data transceiver 144 (e.g., a telemetry transmitter and/or receiver) to transmit acquired measurement data 170 from the receivers $R_x$ to the surface logging facility 156. Logic 140 can be used to send commands and driving signals within the apparatus 100, and to acquire and process received signals (e.g., data 170), according to the various methods described herein. Received data 170 and/or processed forms of the data 170 can be stored in the memory 150, perhaps as part of a database 134. Thus, many embodiments may be realized. As part of the operation of the apparatus 100 and system 102, signal generation, reception, synchronization, transformation, and calibration activities will now be described.

The values of conductivity tensors associated with the formation surrounding the apparatus 100 can be determined using the transmitter $T_x$ and one or more receivers $R_x$, with receiver $R_x$ coil-antennas disposed to excite fields at three non-parallel, usually substantially orthogonal, directions.

In the figure, the $\hat{Z}$ axis is substantially aligned with the borehole longitudinal axis (or drilling direction, during drilling operations). Thus, the $\hat{Z}$ axis is also substantially aligned with the Z-direction of the tool coordinate system, whereas the $\hat{X}$ and the $\hat{Y}$ axes are mutually orthogonal, defining a tool cross-section plane that is orthogonal to the $\hat{Z}$ axis direction. Therefore, coupling measurements defined by the described tool coordinate of the $\hat{X}$, $\hat{Y}$, and $\hat{Z}$ axes can be considered linearly independent, and used to determine formation parameters.

On the other hand, when one set of antennas (e.g., receivers) are fixed with respect to the location of the drill bit 126, and rotate at a different angular speed and/or are oriented differently (e.g., off-axis with respect to the $\hat{Z}$ axis direction) relative to a metal mandrel (e.g., component 106) further back along the string of components that houses another set of antennas (e.g., transmitters), the tool coordinate system between the drill 126 bit and the mandrel may be inconsistent. Consequently, it may be useful to preprocess raw measurements obtained from the receivers $R_x$ to correct for the orientation mismatch between the transmitter $T_x$ and receiver $R_x$, antennas.

As noted earlier, the configuration shown in FIG. 1 is one of many possible configurations. Here, there are two sets of antennas, one transmitter $T_x$ and three receiver $R_x$, antennas, with the receiver $R_x$, antennas fixed with respect to the drill bit 126 and the transmitter $T_x$ antenna fixed with respect to the mandrel component 106. Thus, the angular velocity of the components 106, 108 can be different. When the orientation of three receiver $R_x$ antennas is such that their origins are located at the same position along the $+\hat{Z}$ axis in space, the group of receivers $R_x$ are sometimes referred to as a "collocated triad" of antennas, or simply a "collocated-triad." This arrangement is shown in FIG. 1.

Thus, as shown in FIG. 1, the transmitter $T_x$ and receiver $R_x$, antennas may comprise collocated tilted and/or non-tilted loop antennas. Collocated antenna origins can provide more accurate measurements in some embodiments.

In this case, a tool is configured with one tilted transmitter and three tilted receivers. However, many different combinations, with varied configurations of transmitter and receivers can be used to achieve similar results, to measure nine coupling components corresponding to three orthogonal directions of transmission, and three orthogonal directions of reception.

For the purposes of this document, a coordinate system is defined that includes a set of receiver $R_x$ axes of $x_r$, $y_r$, and $z_r$, and a set of transmitter $T_x$ axes of $x_t$, $y_t$, and $z_t$. By driving the transmitter $T_x$ to produce a signal in one of the $x_t$, $y_t$, and $z_t$, directions, and receiving the transmitter signals at the receivers $R_x$ in one of the $x_r$, $y_r$, and $z_r$ directions, nine measurements can be obtained, which enables determination of a magnetic coupling matrix H, shown in Equation (1).

$$\begin{bmatrix} Hx_r \\ Hy_r \\ Hz_r \end{bmatrix} = \begin{bmatrix} Cx_ix_r & Cx_iy_r & Cx_iz_r \\ Cy_ix_r & Cy_iy_r & Cy_iz_r \\ Cz_ix_r & Cz_iy_r & Cz_iz_r \end{bmatrix} \begin{bmatrix} Mx_i \\ My_i \\ Mz_i \end{bmatrix} \quad (1)$$

In Equation (1), $Mx_t$, $My_t$, and $Mz_t$ are the magnetic moments of the transmitted signal emitted by the transmitter(s) $T_x$ in the $x_t$, $y_t$, and $z_t$ directions, respectively. $Hx_r$, $Hy_r$, and $Hx_r$ are magnetic fields, proportional to the received signals at the receivers $R_x$ in the $x_r$, $y_r$, and $z_r$ directions, respectively. The transmitter $T_x$ is separated from the three receivers $R_x$ by a distance d.

Nine absolute or differential measurements can be obtained when the transmitter $T_x$ is driven to propagate a signal three times during the course of a single rotation (i.e., in three different directions), with a received signal being measured at each of the three receivers $R_x$, respectively. These nine measurements enable the determination of a complete coupling matrix C. In this case, $C_{IJ}=\alpha_{IJ} \cdot V_{IJ}$, where I is the transmitter index in the $x_t$, $y_t$, and $z_t$ directions, J is the receiver index in the $x_r$, $y_r$, and $z_r$ directions, $a_{IJ}$ is a constant coefficient determined by the tool design, and $V_{IJ}$ is a complex value representing the signal amplitude and phase shift measured by receiver in the J direction in response to driving the transmitter to propagate a signal in the I direction.

It should be noted that it is not necessary to physically install three substantially orthogonal orientations of transmitters $T_x$ and/or receivers $R_x$ to measure the nine coupling components shown in Equation (1). Owing to LWD rotation of the components 106, 108, and the use of tilted antennas, decoupling nine components is possible using less than the three receivers shown in FIG. 1.

That is, the embodiment in FIG. 1 illustrates using at least one tilted transmitter $T_x$ (tilted at angle $\theta_t$ with respect to the tool azimuthal plane defined by axes $\hat{X}$ and $\hat{Y}$ of the component 106), and three tilted receivers $R_x$ (tilted at angles $\theta_{r1}$, $\theta_{r2}$, $\theta_{r3}$ with respect to the tool azimuthal plane defined by similar orthogonal axes of the component 108). Other embodiments may include two tilted transmitters orientated at two different tool azimuthal angles, and two tilted receivers orientated at another two tool azimuthal angles. For example, owing to principles of antenna reciprocity, the transmitter(s) and receiver(s) may be interchangeable, as those of ordinary skill in the art will realize, after reading this document and the associated figures.

For simplicity in the following discussion, it is assumed that nine coupling components are obtained. Those of ordinary skill in the art will realize, after studying the balance of this disclosure, and the included figures, that less than nine coupling components may be obtained, with the balance inferred. For example, this may occur when some of the transmitter $T_x$ and/or receiver $R_x$ antenna mounting orientations are known to be symmetric.

For the purposes of this example, one may assume that both the transmitter $T_x$ and the receivers $R_x$, shown in FIG. 1 rotate during LWD operation. Since the transmitter $T_x$ typically rotates at a different speed from the receivers $R_x$, over a period of time one or more of the receivers $R_x$ may operate to measure the signal from the transmitter $T_x$ at different orientations. Thus, in some embodiments, the three tilted receivers $R_x$ may be reduced to only one tilted receiver $R_x$, and nine coupling components can still be determined. This may occur when stationary azimuthal measurements using the single tilted receiver $R_x$ are acquired at a depth, the tilted transmitter $T_x$ is rotated at a different speed from the tilted receiver $R_x$, and the azimuthal measurements are obtained before calibration occurs. In some embodiments, a single tilted transmitter $T_x$ and three receivers $R_x$ are used, with two of the receivers $R_x$ being tilted, and one of the receivers $R_x$, being unfilled.

Figure 2:
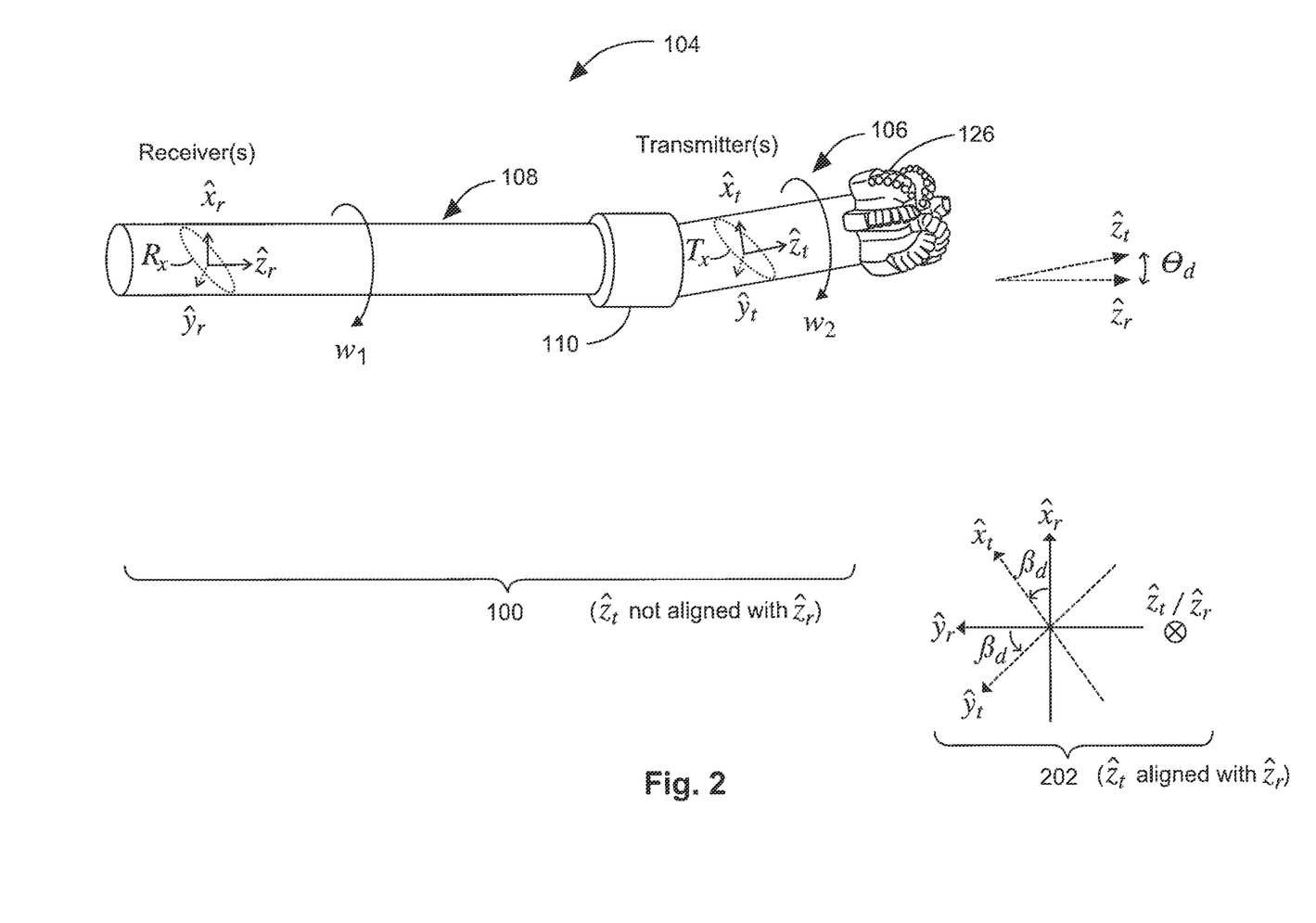
FIG. 2 illustrates an example down hole tool having two variably, rotationally coupled components according to various embodiments of the invention.

To more easily understand the potential interaction between the transmitter $T_x$ and the receivers $R_x$, FIG. 2 illustrates an example housing 104 that includes two variably, rotationally coupled components 106, 108 according to various embodiments of the invention. Unlike the configuration of the apparatus 100 shown in FIG. 1, the transmitters $T_x$ and receivers $R_x$ of the apparatus 100 in FIG. 2 are off-axis (out of alignment along the $\hat{Z}$ axis direction), such that the $\hat{Z}$ axis of the transmitters $\hat{Z}_t$ and the $\hat{Z}$ axis of the receivers $\hat{Z}_r$ so not lie along the same line.

In theory, transmitter and receiver coordinate systems are supposed to be consistent, such that assuming the acquired nine coupling components are linearly independent leads to an accurate determination of formation parameters. However, in practice, when the rotating speeds are different between the transmitters $T_x$ and receivers $R_x$, the $\hat{X}$ and $\hat{Y}$ directions of each set of elements (e.g., transmitter and receiver antennas) will not be consistent, and the measurements obtained by the receivers $R_x$ may be erroneous.

To implement various embodiments, before rotational operation of an LWD/MWD tool housing 104, the orientation of each BHA mandrel should be known and recorded, usually in tool system coordinates. In this way, one can determine the difference between the orientation of the transmitters $T_x$ and the receivers $R_x$ before rotating operations begin. In some embodiments, the rotation speed of each component 106, 108 is usually also known and substantially constant (e.g., the rotational speed of one component is within ±10% of the speed of the other) for the duration of a single 360 degree rotation.

For the following discussion, assume that the rotation speed of the receivers $R_x$ is indicated by $\omega_1$ and the rotation speed of the transmitters $T_x$ is indicated by $\omega_2$. Further, assume that the angular difference between the $x_t$ and $x_r$ axes (or the $y_t$ and $y_r$ axes) during rotation is indicated by $\beta_d$. In a simplified case, illustrated by the diagram 202, it is also assumed that the angular difference $\theta_d$ between the $\hat{Z}_r$ and $\hat{Z}_t$ axes is zero, so that the coordinate systems of the transmitters $T_x$ and the receivers $R_x$ are collinear along the $\hat{Z}$ axis.

The rotation speeds $\omega_1$ and $\omega_2$ may be constant or inconstant, as determined by the movement of the transmitter axes $(x_t, y_t, z_t)$ and receiver axes $(x_r, y_r, z_r)$ with respect to one another. A magnetometer and/or gravity tool (making up one or more spatial orientation packages SO1, SO2) and/or timing devices (e.g., the clock CLOCK) can be used to detect the instantaneous location of the transmitter and receiver axes $(x_t, y_t, z_t)$ and $(x_r, y_r, z_r)$, respectively, and the corresponding rotating speeds $\omega_1$ and $\omega_2$ during logging and/or drilling operations.

The angle $\beta_d$ can be calculated using the equation $\beta_d = a \cos(\hat{x}_t \cdot \hat{x}_r) = a \cos(\hat{y}_t \cdot \hat{y}_r)$. In the simplified case illustrated by the diagram 202 in FIG. 2, the directions $\hat{Z}_r$ and $\hat{Z}_t$ are always consistent (as shown in FIG. 1)—even when the rotation speeds for each set of transmitters $T_x$ and receivers $R_x$ are different. Based on this relationship, one can transform the raw measurements (e.g., H-field values based on voltage measurements) of the nine coupling components using Equation (2), to obtain a calibrated magnetic coupling matrix $C_{cal}$, which is the product of a rotation matrix and the raw measurements.

$$C_{cal} = \begin{bmatrix} \cos\beta_d & -\sin\beta_d & 0 \\ \sin\beta_d & \cos\beta_d & 0 \\ 0 & 0 & 1 \end{bmatrix} \cdot \begin{bmatrix} Cx_ix_r & Cx_iy_r & Cx_iz_r \\ Cy_ix_r & Cy_iy_r & Cy_iz_r \\ Cz_ix_r & Cz_iy_r & Cz_iz_r \end{bmatrix} = \quad (2)$$

$$\begin{bmatrix} Cx_ix_r\cos\beta_d - & Cx_iy_r\cos\beta_d - & Cx_iz_r\cos\beta_d - \\ Cy_ix_r\sin\beta_d & Cy_iy_r\sin\beta_d & Cy_iz_r\sin\beta_d \\ Cx_ix_r\sin\beta_d + & Cx_iy_r\sin\beta_d + & Cx_iz_r\sin\beta_d + \\ Cy_ix_r\cos\beta_d & Cy_iy_r\cos\beta_d & Cy_iz_r\cos\beta_d \\ Cz_ix_r & Cz_iy_r & Cz_iz_r \end{bmatrix}$$

Since $\omega_1$ and $\omega_2$ are known during rotating operations, Equation (2) can be modified on the basis of time t, and expressed as Equation (3), $$C_{cal}(t) = \quad (3)$$

$$\begin{bmatrix} Cx_ix_r(t)\cos\beta_d(t) - & Cx_iy_r(t)\cos\beta_d(t) - & Cx_iz_r(t)\cos\beta_d(t) - \\ Cy_ix_r(t)\sin\beta_d(t) & Cy_iy_r(t)\sin\beta_d(t) & Cy_iz_r(t)\sin\beta_d(t) \\ Cx_ix_r(t)\sin\beta_d(t) + & Cx_iy_r(t)\sin\beta_d(t) + & Cx_iz_r(t)\sin\beta_d(t) + \\ Cy_ix_r(t)\cos\beta_d(t) & Cy_iy_r(t)\cos\beta_d(t) & Cy_iz_r(t)\cos\beta_d(t) \\ Cz_ix_r(t) & Cz_iy_r(t) & Cz_iz_r(t) \end{bmatrix} =$$

$$\begin{bmatrix} C_{xx}^{cal}(t) & C_{xy}^{cal}(t) & C_{xz}^{cal}(t) \\ C_{yx}^{cal}(t) & C_{yy}^{cal}(t) & C_{yz}^{cal}(t) \\ C_{zx}^{cal}(t) & C_{zy}^{cal}(t) & C_{zz}^{cal}(t) \end{bmatrix}$$

The angle $\beta_d(t)$ can be calculated as the angular difference between the set of transmitters $T_x$ and the set of receivers $R_x$ at time t, per equation (4).

$$\begin{cases} \beta_d(t) = \beta_d + \int_{t_0}^{t} (\omega_1 - \omega_2) \, dt \\ C_{xx}^{cal}(t) = Cx_ix_r(t)\cos\beta_d(t) - Cy_ix_r(t)\sin\beta_d(t) \\ C_{xy}^{cal}(t) = Cx_iy_r(t)\cos\beta_d(t) - Cy_iy_r(t)\sin\beta_d(t) \\ C_{xz}^{cal}(t) = Cx_iz_r(t)\cos\beta_d(t) - Cy_iz_r(t)\sin\beta_d(t) \\ C_{yx}^{cal}(t) = Cx_ix_r(t)\sin\beta_d(t) + Cy_ix_r(t)\cos\beta_d(t) \\ C_{yy}^{cal}(t) = Cx_iy_r(t)\sin\beta_d(t) + Cy_iy_r(t)\cos\beta_d(t) \\ C_{yz}^{cal}(t) = Cx_ix_r(t)\sin\beta_d(t) + Cy_iz_r(t)\cos\beta_d(t) \\ C_{zx}^{cal}(t) = Cz_ix_r(t) \\ C_{zy}^{cal}(t) = Cz_iy_r(t) \\ C_{zz}^{cal}(t) = Cz_iz_r(t) \end{cases} \quad (4)$$

Therefore, when processing raw measurements obtained from LWD/MWD tools in real-time, the nine coupling components can be calibrated on the basis of (a) the angular difference ($\beta_d$) between the transmitters $T_x$ and receivers $R_x$ before rotating operation begins, (b) the rotation speed of the two components (e.g., a mandrel ($\omega_1$) coupled to a bit ($\omega_2$)) while rotation occurs, and (c) raw measurements of the nine coupling components based on time (t).

In a more general case, as the drilling direction changes, the $z_t$ and $z_r$ axes may develop different orientations, so that they are no longer aligned (per diagram 202). For example, the magnitude of the angular separation $\theta_d$ between the $\hat{Z}_r$ and $\hat{Z}_t$ axes over a distance d of 15 m might be on the order of 10 degrees.

The apparatus 100 shown in FIG. 2 illustrates this situation, with a non-zero angular separation $\theta_d$, where the bit 126 revolves about the drilling direction $\hat{Z}_t$, which is not the same longitudinal direction $\hat{Z}_r$ of the mandrel component 108 (where the receivers $R_x$ are located, behind the coupling mechanism 110, which in this case comprises a rotary steerable system).

In this more general case, the angle $\theta_d$ is often known in practice and may be calculated using the equation $\theta_d = a \cos(\hat{z}_t \cdot \hat{z}_r)$. Thus, the calibrated magnetic coupling matrix $C_{cal}$ matrix of Equation (3) can be further modified on the basis of the value of the angle $\theta_d$, per Equation (5).

$$C_{cal}^{\theta_d}(t) = \begin{bmatrix} \cos\theta_d & 0 & \sin\theta_d \\ 0 & 1 & 0 \\ -\sin\theta_d & 0 & \cos\theta_d \end{bmatrix} \cdot \begin{bmatrix} C_{xx}^{cal}(t) & C_{xy}^{cal}(t) & C_{xz}^{cal}(t) \\ C_{yx}^{cal}(t) & C_{yy}^{cal}(t) & C_{yz}^{cal}(t) \\ C_{zx}^{cal}(t) & C_{zy}^{cal}(t) & C_{zz}^{cal}(t) \end{bmatrix} = \qquad (5)$$

$$\begin{bmatrix} C_{xx}^{cal}(t)\cos\theta_d + & C_{xy}^{cal}(t)\cos\theta_d + & C_{xz}^{cal}(t)\cos\theta_d + \\ C_{zx}^{cal}(t)\sin\theta_d & C_{zy}^{cal}(t)\sin\theta_d & C_{zz}^{cal}(t)\sin\theta_d \\ C_{yx}^{cal}(t) & C_{yy}^{cal}(t) & C_{yz}^{cal}(t) \\ -C_{xx}^{cal}(t)\sin\theta_d + & -C_{xy}^{cal}(t)\sin\theta_d + & -C_{xz}^{cal}(t)\sin\theta_d + \\ C_{zx}^{cal}(t)\cos\theta_d & C_{zy}^{cal}(t)\cos\theta_d & C_{zz}^{cal}(t)\cos\theta_d \end{bmatrix}$$

Thus, to obtain calibration of the raw measurements, an orientation transformation (using a rotation matrix) is applied to the measured components of the magnetic coupling matrix. Indeed, Equations (3)-(5) can be used to calibrate nine measured coupling components on the basis of (1) time, (2) the angular difference $\beta_d$ between the $x_t$ and $x_r$ axes (or the $y_t$ and $y_r$ axes), (3) the rotation speeds $\omega_1$ and $\omega_2$, and (4) the angular difference $\theta_d$ between the $\hat{Z}_r$ and $\hat{Z}_t$ axes. Therefore, the relationships between raw measurements of the coupling components and the calibrated coupling components can be generalized as shown in Equation (6).

$$\begin{cases} C_{xx}^{cal}(t, \beta_d, \omega_1, \omega_2, \theta_d) = \left\{ \begin{array}{l} Cx_i x_r(t)\cos[\beta_d + (\omega_1 - \omega_2) \times t] - \\ Cy_i x_r(t)\sin[\beta_d + (\omega_1 - \omega_2) \times t] \end{array} \right\} \cos\theta_d + Cz_i x_r(t)\sin\theta_d \\[6pt]
C_{xy}^{cal}(t, \beta_d, \omega_1, \omega_2, \theta_d) = \left\{ \begin{array}{l} Cx_i y_r(t)\cos[\beta_d + (\omega_1 - \omega_2) \times t] - \\ Cy_i y_r(t)\sin[\beta_d + (\omega_1 - \omega_2) \times t] \end{array} \right\} \cos\theta_d + Cz_i y_r(t)\sin\theta_d \\[6pt]
C_{xz}^{cal}(t, \beta_d, \omega_1, \omega_2, \theta_d) = \left\{ \begin{array}{l} Cx_i z_r(t)\cos[\beta_d + (\omega_1 - \omega_2) \times t] - \\ Cy_i z_r(t)\sin[\beta_d + (\omega_1 - \omega_2) \times t] \end{array} \right\} \cos\theta_d + Cz_i z_r(t)\sin\theta_d \\[6pt]
C_{yx}^{cal}(t, \beta_d, \omega_1, \omega_2, \theta_d) = Cx_i x_r(t)\sin[\beta_d + (\omega_1 - \omega_2) \times t] + Cy_i x_r(t)\cos[\beta_d + (\omega_1 - \omega_2) \times t] \\[6pt]
C_{yy}^{cal}(t, \beta_d, \omega_1, \omega_2, \theta_d) = Cx_i y_r(t)\sin[\beta_d + (\omega_1 - \omega_2) \times t] + Cy_i y_r(t)\cos[\beta_d + (\omega_1 - \omega_2) \times t] \\[6pt]
C_{yz}^{cal}(t, \beta_d, \omega_1, \omega_2, \theta_d) = Cx_i z_r(t)\sin[\beta_d + (\omega_1 - \omega_2) \times t] + Cy_i z_r(t)\cos[\beta_d + (\omega_1 - \omega_2) \times t] \\[6pt]
C_{zx}^{cal}(t, \beta_d, \omega_1, \omega_2, \theta_d) = -\left\{ \begin{array}{l} Cx_i x_r(t)\cos[\beta_d + (\omega_1 - \omega_2) \times t] - \\ Cy_i x_r(t)\sin[\beta_d + (\omega_1 - \omega_2) \times t] \end{array} \right\} \sin\theta_d + Cz_i x_r(t)\cos\theta_d \\[6pt]
C_{zy}^{cal}(t, \beta_d, \omega_1, \omega_2, \theta_d) = -\left\{ \begin{array}{l} Cx_i y_r(t)\cos[\beta_d + (\omega_1 - \omega_2) \times t] - \\ Cy_i y_r(t)\sin[\beta_d + (\omega_1 - \omega_2) \times t] \end{array} \right\} \sin\theta_d + Cz_i y_r(t)\cos\theta_d \\[6pt]
C_{zz}^{cal}(t, \beta_d, \omega_1, \omega_2, \theta_d) = -\left\{ \begin{array}{l} Cx_i z_r(t)\cos[\beta_d + (\omega_1 - \omega_2) \times t] - \\ Cy_i z_r(t)\sin[\beta_d + (\omega_1 - \omega_2) \times t] \end{array} \right\} \sin\theta_d + Cz_i z_r(t)\cos\theta_d
\end{cases} \qquad (6)$$

Figure 3:
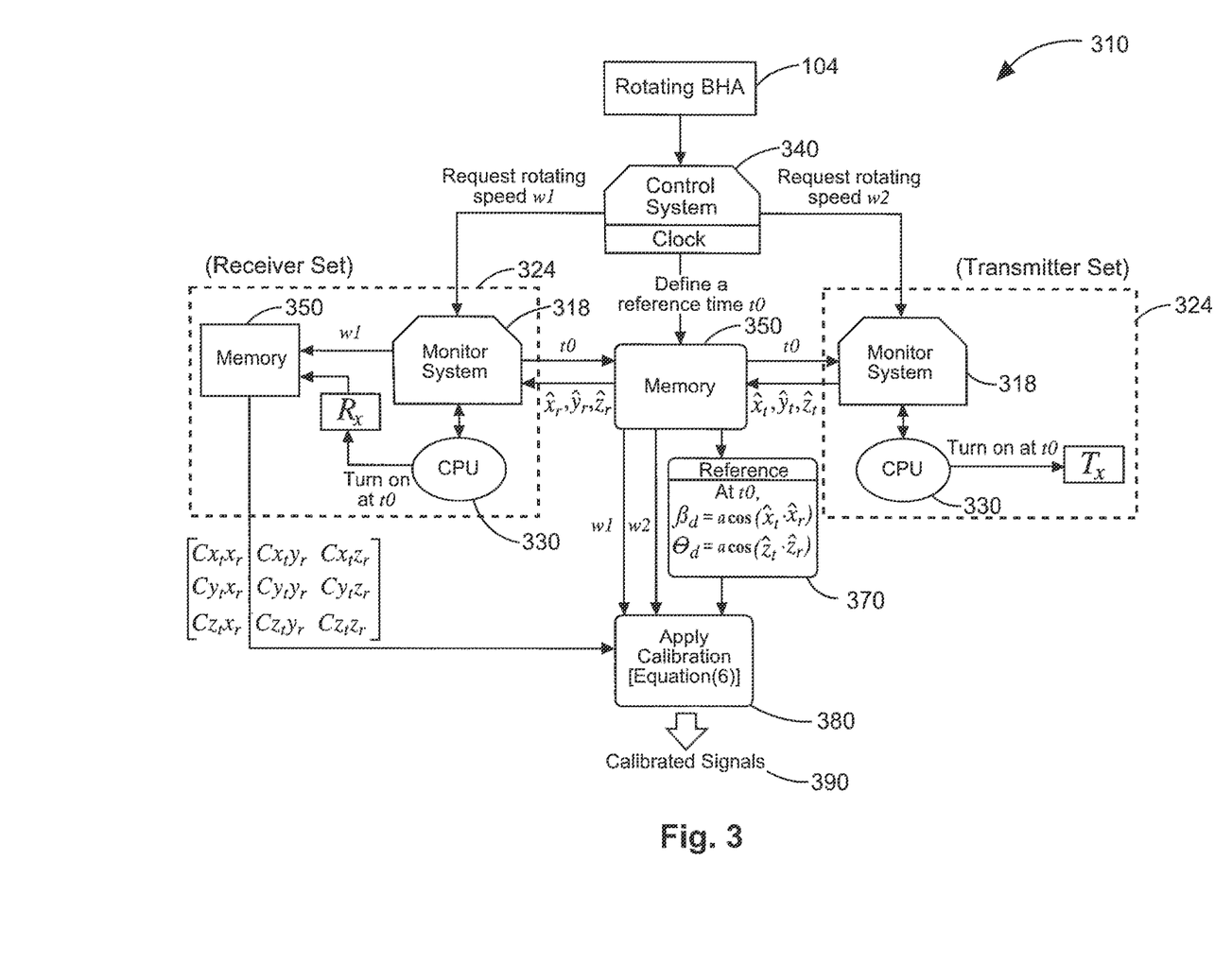
FIG. 3 is a block diagram illustrating calibration operations according to various embodiments of the invention.

FIG. 3 is a block diagram 310 illustrating calibration operations according to various embodiments of the invention. Here the calibration procedures used to transform raw measurements obtained from rotating receiver(s), in response to the transmitted signals from non-aligned rotating transmitter(s), can be seen. The operations and components shown in the diagram 310 correspond to activities conducted by various components of the apparatus 100 and system 102 of FIGS. 1-2.

In some embodiments, the rotating BHA, serving as a housing 104, provides spatial orientation signals (e.g., via one or more spatial orientation packages) to a control system 340. The control system 340 in turn provides rotation speed signals representing the rotational speeds $\omega_1$, $\omega_2$ to monitoring systems 318. These rotational speeds $\omega_1$, $\omega_2$ are associated with variably, rotationally coupled down hole tool components attached to the transmitters $T_x$ and receivers $R_x$ located on the potentially non-aligned components.

One or more processors 330 communicate with the monitoring systems 318 to store values in a memory 350, and to extract values from the memory 350, which may comprise a single memory, or a distributed memory. The transmitters $T_x$ and receivers $R_x$, via transmission of signals from the transmitters $T_x$, and reception of the transmitted signals by the receivers $R_x$, provide the nine coupling components as raw measurements. A clock CLOCK in the control system 340 can be used to synchronize transmission and reception between the transmitters $T_x$ and receivers $R_x$.

After reference (e.g., non-rotating) measurements are obtained at block 370, the raw measurements can be obtained and calibrated by transforming them, using Equation (6), at block 380. Calibrated measurements, perhaps in the form of analog or digital signals 390, are the result.

Thus, referring now to FIGS. 1-3, it can be seen that many embodiments may be realized, including an apparatus 100 that comprises one or more tilted transmitter(s) $T_x$ and one or more tilted receiver(s) $R_x$, as well as one or more processors 130, 330 attached to a multi-component tool housing 104 (e.g., a down hole tool). The housing 104 may comprise part of a BHA, and there may be several intervening tools or other components coupled between the first and the second components 106, 108.

For example, in some embodiments an apparatus 100 comprises a housing 104 including a first downhole component 106 variably, rotationally coupled to a second downhole component 108. The apparatus 100 may further comprise at least one tilted transmitter $T_x$ attached to the first downhole component 106 and at least one tilted receiver $R_x$ attached to the second downhole component 108.

The apparatus 100 may also comprise a processor 130 housed by the housing 104, where the processor is configured to determine spatial orientations of the at least one tilted receiver $R_x$ relative to the at least one tilted transmitter $T_x$, at common points in time during rotation of the first and the second downhole components 106, 108. The processor(s) 130 may be further configured to transform raw measurements of transmitter signals provided by the at least one tilted receiver $R_x$ into calibrated measurements based on the spatial orientations at the common points in time. The common points in time are used to synchronize the signals sent by the transmitter(s) $T_x$, and received by the receiver(s) $R_x$.

The downhole components 106, 108 (and other components in a down hole tool string) may be coupled together using a variety of coupling mechanisms 110, such as a universal joint or a transmission, etc. Thus, in some embodiments, the first and the second downhole components 106, 108 may be variably, rotationally coupled by a rotary steering system, among other mechanisms.

Loop antennas can be used as the transmitters and/or receivers. Thus, in some embodiments, the apparatus 100 may include at least one tilted receiver $R_x$ or the at least one tilted transmitter $T_x$, either of which may comprise a loop antenna.

A clock can be carried in the housing to use as a common reference. Thus, in some embodiments, the apparatus 100 may comprise a clock CLOCK to provide a reference signal for the common points in time.

The downhole components may comprise one or more mandrels. Thus, in some embodiments, at least one of the first or the second downhole components 106, 108 comprises a mandrel.

The apparatus 100 may include one or more absolute spatial references, such as an inclinometer and/or gravity meter, to determine the spatial orientations of the individual downhole components in real time. Thus, in some embodiments, the apparatus 100 may comprise at least one spatial orientation package SO1, SO2 to provide an absolute reference for spatial orientations. Additional embodiments may be realized, and thus, some examples of system embodiments will now be described.

Figure 4:
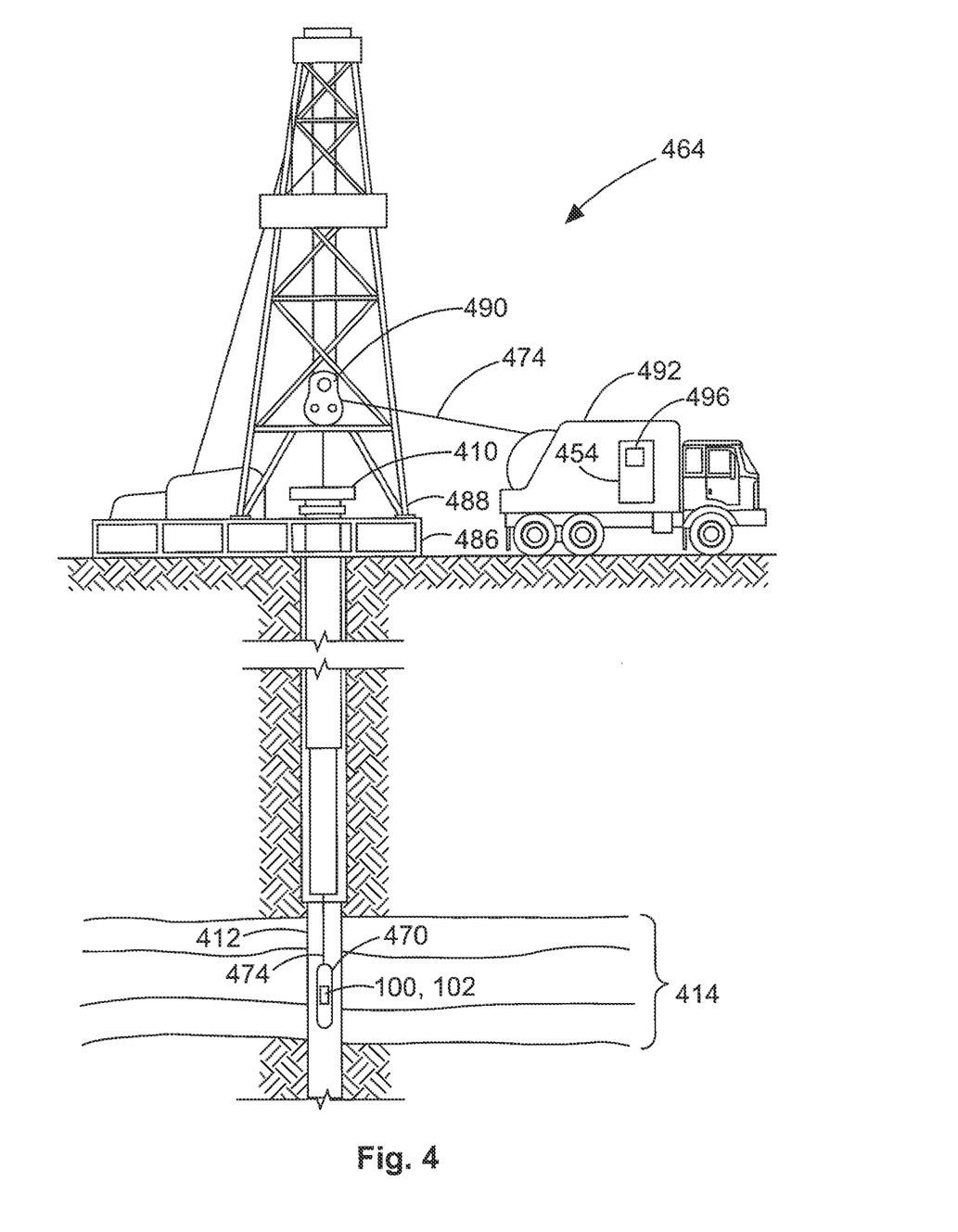
FIG. 4 illustrates a wireline system embodiment of the invention.
Figure 5:
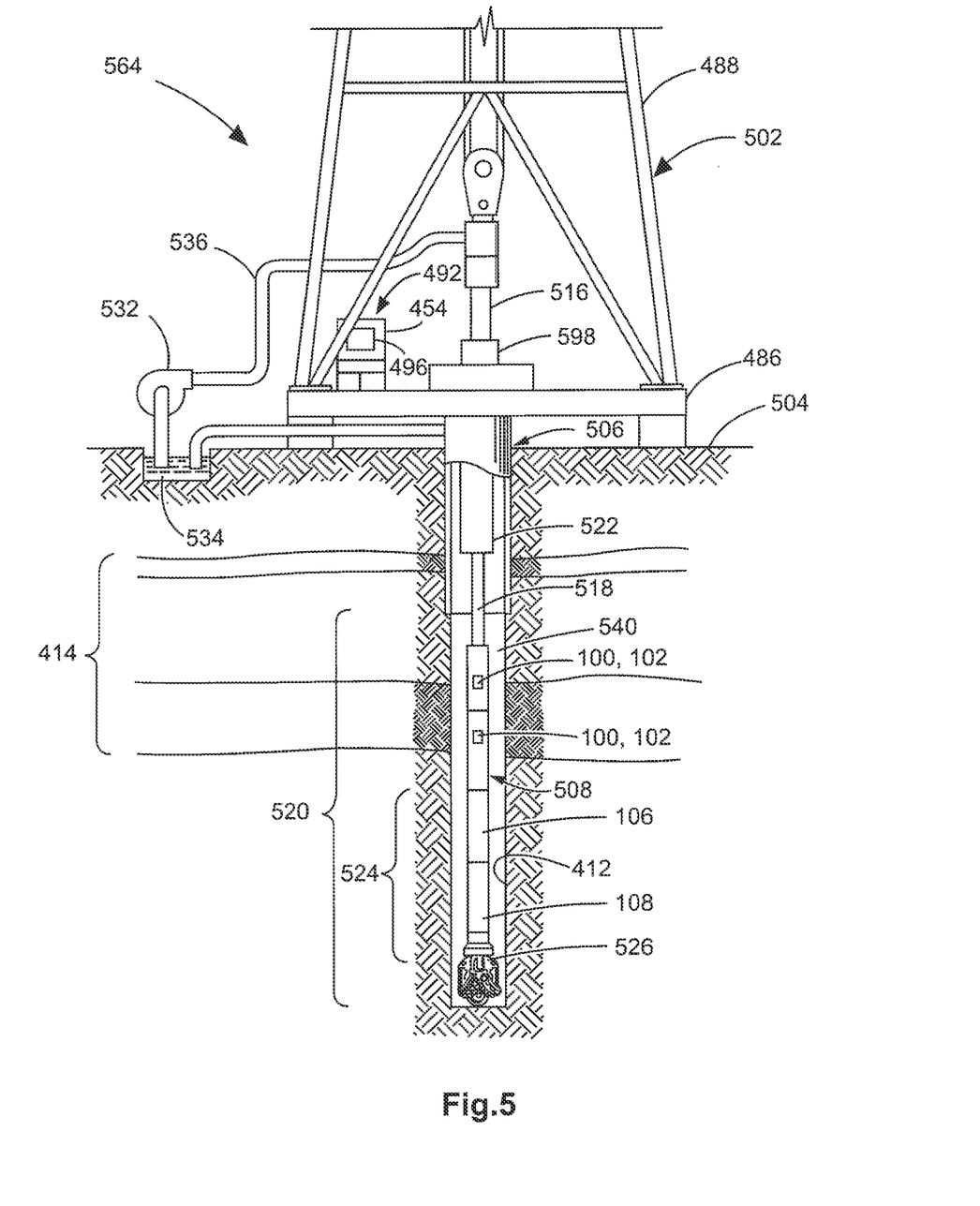
FIG. 5 illustrates a drilling rig system embodiment of the invention.

FIG. 4 illustrates a wireline system 464 embodiment of the invention, and FIG. 5 illustrates a drilling rig system 564 embodiment of the invention. The systems 464, 564 may thus comprise portions of a wireline logging tool body 470 as part of a wireline logging operation, or of a down hole tool 524 as part of a down hole drilling operation.

Referring now to FIG. 4, a well during wireline logging operations can be seen. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths various instruments (e.g., portions of the apparatus 100, and/or system 102 shown in FIG. 1) included in the tool body 470 may be used to perform measurements on the subsurface geological formations 414 adjacent the borehole 412 (and the tool body 470). The measurement data can be communicated to a surface logging facility 492 for processing, analysis, and/or storage. The logging facility 492 may be provided with electronic equipment for various types of signal processing, which may be implemented by any one or more of the components of the apparatus 100 or system 102 in FIG. 1. Similar formation evaluation data may be gathered and analyzed during drilling operations during LWD/MWD operations, and by extension, sampling while drilling).

In some embodiments, the tool body 470 is suspended in the wellbore by a wireline cable 474 that connects the tool to a surface control unit (e.g., comprising a workstation 454). The tool may be deployed in the borehole 412 on coiled tubing jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518. As can be seen in the figure, the system 564 may comprise one or more of the apparatus 100 and/or system 102 shown in FIG. 1, including component portions thereof (e.g., components 106, 108).

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1-2 and 4-5, it may be seen that in some embodiments, the systems 464, 564 may include a drill collar 522, a down hole tool 524, and/or a wireline logging tool body 470 to house one or more apparatus 100, similar to or identical to the apparatus 100 described above and illustrated in FIG. 1. Components of the system 102 in FIG. 1 may also be housed by the tool 524 or the tool body 470.

Thus, for the purposes of this document, the term "housing" may include any one or more of a drill collar 522, a down hole tool 524, or a wireline logging tool body 470 (all having an outer surface, to enclose or attach to magnetometers, acoustic transducers, fluid sampling devices, pressure measurement devices, temperature measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present electromagnetic coupling information, both measured and processed/calculated, as well as database information, perhaps in graphic form. A system 464, 564 may also include computation logic, perhaps as part of a surface logging facility 492, or a computer workstation 454, to send signals to transmitters and to receive signals from receivers, and other instrumentation to determine properties of the formation 414 based on the received signals, or calibrated versions thereof.

Thus, a system 464, 564 may comprise a housing, such as a wireline logging tool body 470 or a down hole tool 524 (e.g., an LWD or MWD tool body), and portions of one or more apparatus 100 and/or systems 102 attached to the tool body, the apparatus 100 and/or system 102 to be constructed and operated as described previously. The processor(s) 130 in the systems 464, 564 may be attached to the housing 104, or located at the surface, as part of a surface computer (e.g., in the surface logging facility 156) as shown in FIG. 1.

The apparatus 100; systems 102, 464, 564; components 106, 108; coupling mechanism 110; data acquisition system 124; drill bits 126, 526; processor(s) 130, 330; database 134; logic 140; transceiver 144; memories 150, 350; logging facility, 156; surface 166; monitoring systems 318; control system 340; rotary table 410; borehole 412; computer workstation 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; hose 536; clock CLOCK; receivers $R_x$, spatial orientation packages SO1, SO2; and transmitters $T_x$ may all be characterized as "modules" herein.

Such modules may include hardware circuitry, and/or a processor and/or memory circuits, software program modules and objects, and/or firmware, and combinations thereof, as desired by the architect of the apparatus 100 and systems 102, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling operations, and thus, various embodiments are not to be so limited. The illustrations of apparatus 100 and systems 102, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
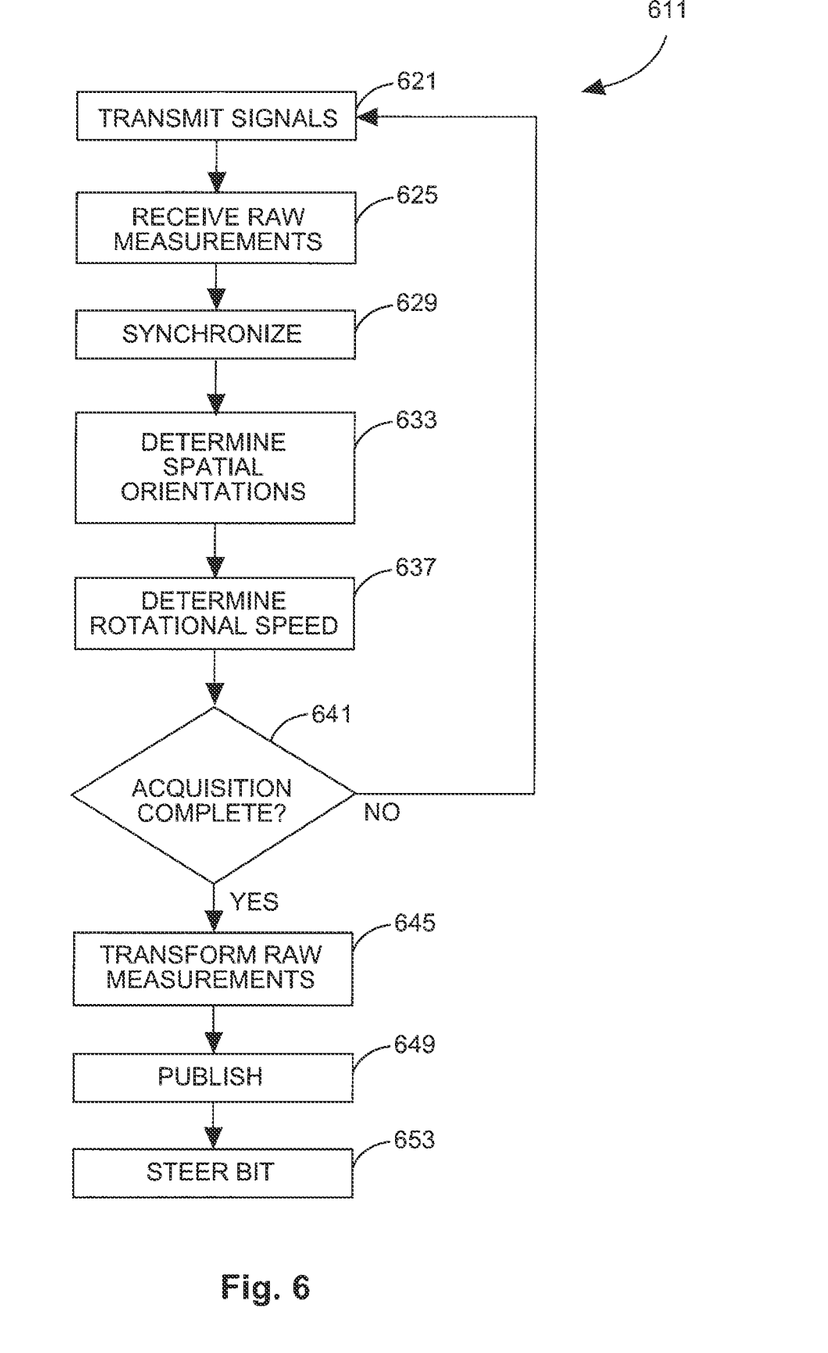
FIG. 6 is a flowchart illustrating several methods according to various embodiments of the invention.

For example, FIG. 6 is a flow chart illustrating several methods 611 according to various embodiments of the invention. One method 611 may comprise determining relative spatial differences between transmitters and receivers at common points in time at block 633, and calibrating raw coupling measurements by transforming them at block 645, perhaps in real time (e.g., while rotation occurs). In some embodiments, the relative spatial differences are used to derive rotational speed differences at block 637.

Thus, a processor-implemented measurement calibration method 611, to execute on one or more processors that perform the method, may begin at block 621 to include driving a set of one or more transmitters (e.g., transmitting antennas) to produce transmitter signals. These signals may propagate into the formation surrounding a down hole tool or wireline tool, and return to a set of one or more receivers (e.g., receiving antennas).

The method 611 may continue on to block 625 to include receiving the transmitter signals, after propagation, by the receivers. The raw measurements that can be made may represent electromagnetic coupling components between loop antennas. Thus, the activity at block 625 may comprise receiving the raw measurements from at least one tilted receiver as electromagnetic coupling components between the at least one tilted receiver (e.g., comprising at least one receiving loop antenna), and the at least one tilted transmitter (e.g., comprising as least one transmitting loop antenna).

The raw measurements provided by the receiver(s) may be obtained in the form of voltages or currents, from which the magnetic field surrounding the receiver(s) can be derived. Thus, the raw measurements may comprise measurements of complex voltages or currents.

The raw measurements provided by the receiver(s) may represent electromagnetic coupling components between the transmitter(s) and the receiver(s). For wireline tools that do not rotate during operation, nine coupling components may be obtained using three orthogonal transmitters that provide signals to be received at three orthogonal receivers. For LWD/MWD tools, where rotation occurs, a tilted transmitter and three tilted receivers oriented at three different azimuthal angles, respectively, may be used to decouple nine coupling components. Thus, in most embodiments, the raw measurements comprise up to nine electromagnetic coupling components Common points in time can be used to synchronize signal transmission and reception. Thus, the method 611 may include the synchronization activity of block 629, wherein the common points in time are used to synchronize transmission of the transmitter signals and reception by the receivers, to provide the raw measurements.

The method 611 may continue on to block 633 to include determining spatial orientations of at least one tilted transmitter attached to a first downhole component, relative to at least one tilted receiver attached to a second downhole component, at common points in time during rotation of the first and the second downhole components. The first downhole component may be variably, rotationally coupled to the second downhole component.

The spatial orientations of the receiver(s)/transmitter(s) can be determined based on the orthogonal directions of their associated signals. Thus, the activity at block 633 may comprise determining orthogonal directions of the transmitter signals and received signals associated with the raw measurements, at substantially the same time the raw measurements are made.

Rotational speeds of the downhole components can be inferred from the spatial orientations. Thus, in some embodiments, the method 611 may continue on to block 637 to comprise deriving a rotational speed of at least one of the first or the second downhole components from the spatial orientations.

If a selected portion of the raw measurement signal acquisition has not been completed, as determined at block 641, then the method 611 may return to block 621. Otherwise, if the selected portion of the acquisition has been completed, the method 611 may continue on to block 645 with transforming the raw measurements of transmitter signals provided by the receiver(s) into calibrated measurements based on the spatial orientations at the common points in time.

Determining values of the calibrated measurements may involve determining rotational speeds of the downhole components. Thus, if the speeds have not already been determined at block 637, then the activity at block 645 may include determining rotational speeds of the first and the second downhole components.

The downhole components may comprise mandrels, bits, etc. Thus, the activity at block 637 and/or block 645 may comprise determining at least one of a mandrel rotational speed or a bit rotational speed.

For example, the transmitter and receiver rotational speeds can be measured directly, instead of being derived from the relative spatial orientations of the transmitters and receivers. Thus, in some embodiments, the activity at blocks 637 or 645 may comprise measuring a rotational speed of the receiver(s), and measuring a rotational speed of the transmitter(s), to determine a difference in rotational speeds between the receiver(s) and transmitter(s).

A rotation matrix can be applied to the raw measurements (e.g., the raw measurements can be multiplied or divided by the rotation matrix) to provide transformed, calibrated measurements. Thus, the activity at block 645 may comprise applying a rotation matrix to the raw measurements.

The calibrated measurements can be used to determine formation parameters, which can in turn be published (e.g., stored in a memory, printed on paper, or transmitted to a computer display) for further processing, or viewing. Thus, the method 611 may continue on to block 649 with publishing one or more formation parameters determined from the calibrated measurements.

During drilling operations, the drill bit can be steered, based on the calibrated measurements. Thus, the method 611 may continue on to block 653 to include steering a drill bit coupled to the first or the second downhole component in a direction determined by the calibrated measurements.

It should be noted that the methods described herein do not have to be executed in the order described, or in any particular order. Moreover, various activities described with respect to the methods identified herein can be executed in iterative, serial, or parallel fashion. The various elements of each method (e.g., the activities and methods shown in FIGS. 3 and 6) can be substituted, one for another, within and between various parts of the activities and methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
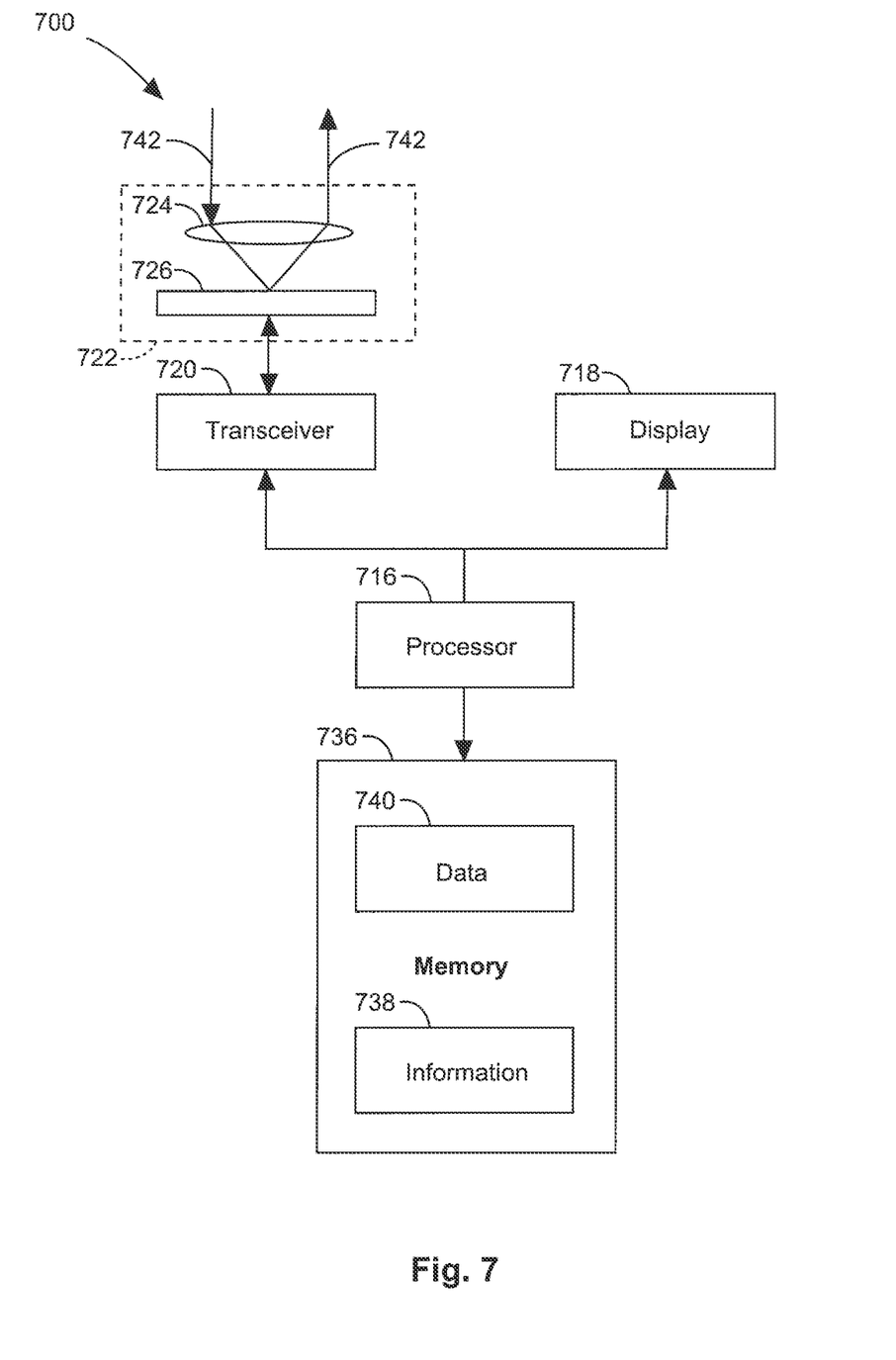
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 2 and 6, the apparatus of FIG. 1, and the systems of FIGS. 1, 4, and 5. The processors 716 may comprise one or more processors sold by Intel Corporation (e.g., Intel® Core™ processor family), Advanced Micro Devices (e.g. AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 shown in FIG. 1. In some embodiments, the article 700 is similar to or identical to the apparatus 100 or system 102 shown in FIG. 1.

In summary, the apparatus, systems, and methods disclosed herein, using inferred or measured relative location information, and measured electromagnetic coupling data, may provide synchronization for transmitters and receivers that rotate at different speeds during down hole logging or drilling operations. To achieve synchronization, the spatial relationship between the transmitters and receivers is determined, and their rotation speeds are recorded. Raw measurements of up to nine coupling components are recorded on the basis of time. Using these parameters, the raw measurements of non-aligned transmitter-receiver sets can be calibrated. As a result, the value of the services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a housing including a first downhole component variably, rotationally coupled to a second downhole component;
   at least one tilted transmitter attached to the first downhole component and at least one tilted receiver attached to the second downhole component;
   a first spatial orientation package that detects instantaneous location and rotation speed of the at least one tilted transmitter;
   a second spatial orientation package that detects instantaneous location and rotation speed of the at least one tilted receiver; and
   a processor housed by the housing, the processor configured to,
   determine spatial orientations of the at least one tilted receiver relative to the at least one tilted transmitter, at common points in time during rotation of the first and the second downhole components, based on the detected instantaneous locations and rotation speeds of the at least one tilted transmitter and the at least one tilted receiver; and
   transform raw measurements of transmitter signals provided by the at least one tilted receiver into calibrated measurements based on the spatial orientations at the common points in time.

2. The apparatus of claim 1, wherein the first and the second downhole components are variably, rotationally coupled by a rotary steering system.

3. The apparatus of claim 1, wherein at least one tilted receiver or the at least one tilted transmitter comprises a loop antenna.

4. The apparatus of claim 1, further comprising:
   a clock to provide a reference signal for the common points in time.

5. The apparatus of claim 1, wherein at least one of the first or the second downhole components comprises a mandrel.

6. The apparatus of claim 1, wherein the at least one receiver is configured to detect fields in three, mutually orthogonal axes including a z axis that is substantially aligned with a borehole longitudinal axis and x and y axes that together form an orthogonal plane with respect to the z axis, and wherein determining spatial orientations of the at least one tilted receiver relative to the at least one tilted transmitter includes calculating an angular difference within the orthogonal plane between the at least one transmitter and the at least one receiver.

7. The apparatus of claim 1, wherein the first downhole component has a different rotational speed than the second downhole component.

8. A measurement calibration method comprising:
   during operation of a downhole apparatus that includes a first downhole component variably, rotationally coupled to a second downhole component, wherein at least one transmitter is attached to the first downhole component and at least one receiver is attached to the second downhole component,
   detecting, by a first spatial orientation package within the downhole apparatus, instantaneous location and rotation speed of the at least one tilted transmitter; and
   detecting, by a second spatial orientation package within the downhole apparatus, instantaneous location and rotation speed of the at least one tilted receiver;
   determining spatial orientations of the at least one tilted transmitter relative to the at least one tilted receiver, at common points in time during rotation of the first and the second downhole components, based on the detected instantaneous locations and rotation speeds of the at least one tilted transmitter and at least one tilted receiver; and
   transforming raw measurements of transmitter signals provided by the at least one tilted receiver into calibrated measurements based on the spatial orientations at the common points in time.

9. The method of claim 8, further comprising:
   deriving a rotational speed of at least one of the first or the second downhole components from the spatial orientations.

10. The method of claim 8, wherein the raw measurements comprise measurements of complex voltages or currents.

11. The method of claim 8, wherein the raw measurements comprise up to nine electromagnetic coupling components.

12. The method of claim 8, wherein determining the spatial orientations comprises:
   determining orthogonal directions of the transmitter signals and received signals associated with the raw measurements, at substantially the same time the raw measurements are made.

13. The method of claim 8, wherein the common points in time are used to synchronize transmission of the transmitter signals and reception of the raw measurements.

14. The method of claim 8, wherein the transforming further comprises:
   determining rotational speeds of the first and the second downhole components.

15. The method of claim 14, wherein determining the rotational speeds comprises determining at least one of a mandrel rotational speed or a bit rotational speed.

16. The method of claim 8, wherein the transforming comprises:
   applying a rotation matrix to the raw measurements.

17. The method of claim 8, further comprising:
   publishing one or more formation parameters determined from the calibrated measurements.

18. The method of claim 8, further comprising:
   steering a drill bit coupled to the first or the second downhole component in a direction determined by the calibrated measurements.

19. The method of claim 8, wherein the at least one receiver is configured to detect fields in three, mutually orthogonal axes including a z axis that is substantially aligned with a borehole longitudinal axis and x and y axes that together form an orthogonal plane with respect to the z axis, and wherein determining spatial orientations of the at least one tilted receiver relative to the at least one tilted transmitter includes calculating an angular difference within the orthogonal plane between the at least one transmitter and the at least one receiver.

20. The method of claim 8, further comprising rotating the first downhole component at a different rotational speed than the second downhole component.

* * * * *